(12) United States Patent
Park et al.

(10) Patent No.: US 9,383,605 B2
(45) Date of Patent: Jul. 5, 2016

(54) BACKLIGHT UNIT AND LIQUID CRYSTAL DISPLAY INCLUDING THE SAME

(71) Applicant: Samsung Display Co. Ltd., Yongin, Gyeonggi-Do (KR)

(72) Inventors: Se Ki Park, Hwaseong-si (KR); Su Chang Ryu, Yongin-si (KR); Jae Sang Lee, Asan-si (KR); Yong Hwi Kim, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 43 days.

(21) Appl. No.: 14/307,633

(22) Filed: Jun. 18, 2014

(65) Prior Publication Data
US 2015/0219964 A1 Aug. 6, 2015

(30) Foreign Application Priority Data
Feb. 3, 2014 (KR) .................. 10-2014-0012162

(51) Int. Cl.
*G02F 1/1333* (2006.01)
*F21V 7/04* (2006.01)
*G02F 1/1335* (2006.01)

(52) U.S. Cl.
CPC .... *G02F 1/133608* (2013.01); *G02F 1/133605* (2013.01); *G02F 1/133606* (2013.01); *G02F 2001/133314* (2013.01); *G02F 2001/133328* (2013.01)

(58) Field of Classification Search
CPC ............. G02F 1/133608; G02F 1/133314; G02F 1/133317; G02F 2001/133314; G02F 2001/133317; G02F 1/133606; G02F 2001/133628
USPC ................. 362/632–634; 349/58, 61
See application file for complete search history.

(56) References Cited

U.S. PATENT DOCUMENTS

| 7,178,951 | B1 | 2/2007 | Hsiao et al. | |
|---|---|---|---|---|
| 8,169,566 | B2 * | 5/2012 | Kim | G02F 1/133608 349/64 |
| 8,212,965 | B2 | 7/2012 | Oke et al. | |
| 8,235,540 | B2 | 8/2012 | Park et al. | |
| 8,553,170 | B2 | 10/2013 | Park et al. | |
| 2005/0151894 | A1* | 7/2005 | Katsuda | G02F 1/133308 349/58 |
| 2007/0030416 | A1* | 2/2007 | Lee | G02F 1/133611 349/67 |
| 2008/0030653 | A1* | 2/2008 | Lee | G02F 1/133604 349/67 |
| 2008/0060244 | A1 | 3/2008 | Yang et al. | |
| 2009/0256796 | A1 | 10/2009 | Jang et al. | |
| 2009/0268121 | A1* | 10/2009 | Hisada | G02F 1/133608 349/58 |
| 2013/0162506 | A1 | 6/2013 | Kim et al. | |

FOREIGN PATENT DOCUMENTS

| JP | 2012-022779 A | 2/2012 |
|---|---|---|
| JP | 2013-143218 A | 7/2013 |

(Continued)

*Primary Examiner* — Nathanael R Briggs
(74) *Attorney, Agent, or Firm* — Cantor Colburn LLP

(57) ABSTRACT

A backlight unit includes a light source portion configured to provide light to a display panel, a reflection sheet arranged on a lower part of the light source portion, a mold frame accommodating the light source portion, and a support frame which supports the mold frame and includes a bottom portion, first and second side wall portions which extend upward from both end sides of the bottom portion and face each other, a ceiling portion which extends in a horizontal direction from an upper end of the first side wall portion, and a slant portion slanted downward from an end part of the ceiling portion and having one end that comes in contact with the end part of the ceiling portion and the other end that comes in contact with an upper end of the second side wall portion.

20 Claims, 18 Drawing Sheets

(56) References Cited

FOREIGN PATENT DOCUMENTS

| KR | 1020080054618 A | 6/2008 |
| KR | 1020080062262 A | 7/2008 |
| KR | 1020080065143 A | 7/2008 |
| KR | 1020080067875 A | 7/2008 |
| KR | 10-0896093 B1 | 5/2009 |
| KR | 101282029 B1 | 6/2013 |
| KR | 1020130060557 A | 6/2013 |
| KR | 1020130063300 A | 6/2013 |
| KR | 10-1311335 B1 | 9/2013 |

* cited by examiner

BACKLIGHT UNIT AND LIQUID CRYSTAL DISPLAY INCLUDING THE SAME

This application is claims priority to Korean Patent Application No. 10-2014-0012162, filed on Feb. 3, 2014, and all the benefits accruing therefrom under 35 U.S.C. §119, the disclosure of which is incorporated herein in its entirety by reference.

BACKGROUND

1. Field

The invention relates to a backlight unit and a liquid crystal display including the same.

2. Description of the Prior Art

A liquid crystal display ("LCD") includes a LCD module that is connected to an external case. The LCD module includes a liquid crystal panel that is composed of two substrates between which a liquid crystal layer is interposed, and a backlight unit that is positioned in the rear of the liquid crystal panel to supply light to the liquid crystal layer. The liquid crystal panel displays an image through adjustment of permeability of light that is provided from the backlight unit.

The backlight unit is classified into a direct type and a photometric type depending on the position of light sources. In the direct type backlight unit, light sources are provided in the rear of a display panel, and in the photometric type backlight unit, light sources are provided on one side of a rear portion of the display panel.

Recently, with the trend of lightweight of a display device, various efforts to reduce the total weight of the display device have been made. As a part of such efforts, in order to reduce the total weight of a backlight unit, various technical researches in structure and material have been made.

SUMMARY

Accordingly, one subject to be solved by the invention is to provide a backlight unit, which can effectively reduce the total weight.

Another subject to be solved by the invention is to provide a liquid crystal display ("LCD"), which can effectively reduce the total weight.

Additional advantages, subjects, and features of the invention will be set forth in part in the description which follows and in part will become apparent to those having ordinary skill in the art upon examination of the following or may be learned from practice of the invention.

In one exemplary embodiment of the invention, there is provided a backlight unit including a light source portion configured to provide light to a display panel, a reflection sheet arranged on a lower part of the light source portion, a mold frame accommodating the light source portion and a support frame which supports the mold frame and includes a bottom portion, first and second side wall portions which extend upward from both end sides of the bottom portion and face each other, a ceiling portion which extends in a horizontal direction from an upper end of the first side wall portion and a slant portion slanted downward from an end part of the ceiling portion and having one end that contacts the end part of the ceiling portion and the other end that contacts an upper end of the second side wall portion.

According to another exemplary embodiment of the invention, there is provided a LCD including a backlight unit, a diffusion plate arranged on an upper part of the backlight unit, at least one optical sheet arranged on an upper part of the diffusion plate, and a display panel arranged on the at least one optical sheet, where the backlight unit includes a light source portion configured to provide light to the display panel, a reflection sheet arranged on a lower part of the light source portion, a mold frame which accommodates the light source portion and a support frame which supports the mold frame and includes, a bottom portion, first and second side wall portions which extend upward from both end sides of the bottom portion and facing each other, a ceiling portion which extends in a horizontal direction from an upper end of the first side wall portion and a slant portion slanted downward from an end part of the ceiling portion and having one end that contacts the end part of the ceiling portion and the other end that contacts with an upper end of the second side wall portion.

The detailed items of other embodiments are included in the detailed description and drawings.

According to the exemplary embodiments of the invention, at least the following effects can be achieved.

That is, by omitting and replacing a bottom chassis by the hollow support frame, the total weight of the backlight unit can be reduced.

Further, by reducing the total weight of the backlight unit, the total weight of the LCD can be reduced.

The effects according to the invention are not limited to the contents as exemplified above, but further various effects are included in the description.

BRIEF DESCRIPTION OF THE DRAWINGS

The above and other objects, features and advantages of the invention will be more apparent from the following detailed description taken in conjunction with the accompanying drawings, in which.

DETAILED DESCRIPTION

Figure 1:
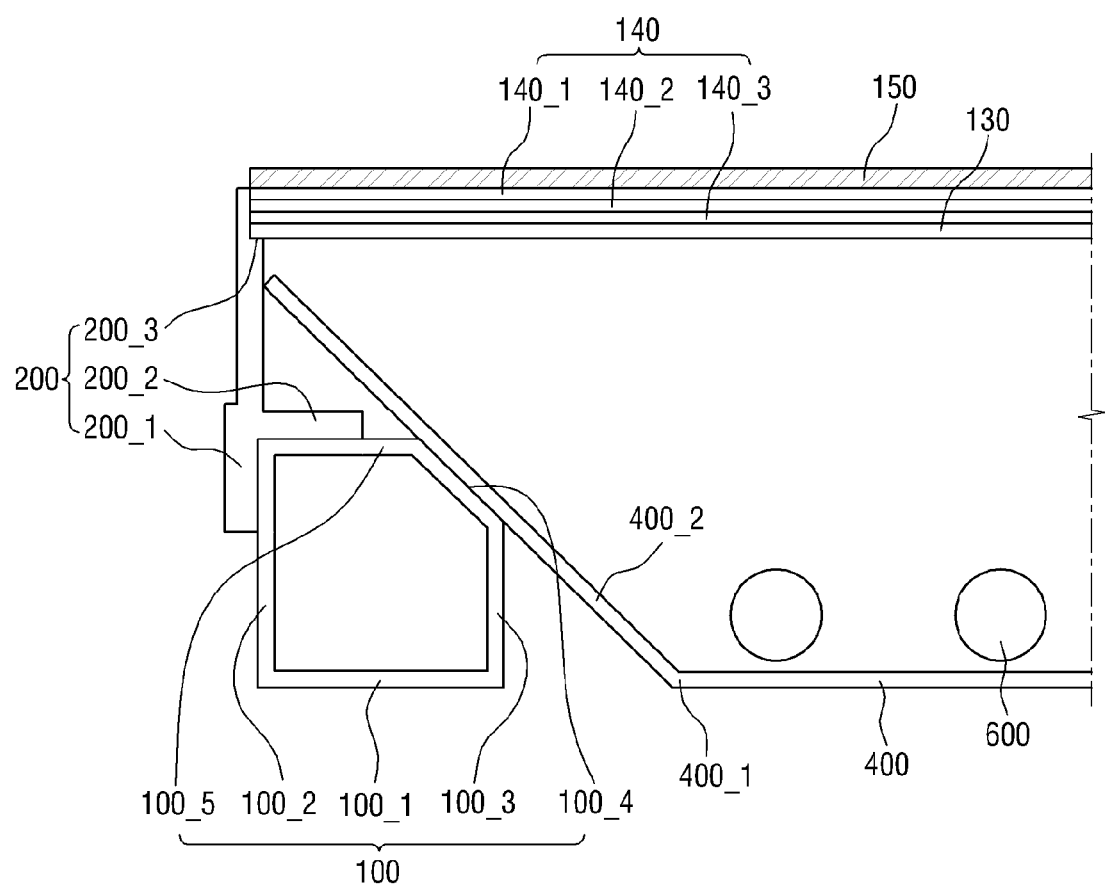
FIG. 1 is a partial cross-sectional view of an exemplary embodiment a backlight unit according to the invention.

The exemplary embodiments and features of the invention and methods for achieving the exemplary embodiments and features will be apparent by referring to the exemplary embodiments to be described in detail with reference to the accompanying drawings. However, the invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the invention is only defined within the scope of the appended claims.

The term "on" that is used to designate that an element is on another element or located on a different layer or a layer includes both a case where an element is located directly on another element or a layer and a case where an element is located on another element via another layer or still another element. In the entire description of the invention, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the accompanying drawings.

FIG. 1 is a partial cross-sectional view of a backlight unit according to an exemplary embodiment of the invention.

Referring to FIG. 1, a backlight unit according to an exemplary embodiment of the invention includes a light source portion 600 providing light to a display panel 150, a reflection sheet arranged on a lower part of the light source portion 600, a mold frame 200 accommodating the light source portion 600, and a support frame 100 supporting the mold frame 200, where the support frame 100 includes a bottom portion 100_1, first and second side wall portions 100_2 and 100_3 provided to extend upward from both sides of the bottom portion 100_1 and facing each other, a ceiling portion 100_5 provided to extend in a horizontal direction from an upper end of the first side wall portion 100_2, and a slant portion 100_4 slanted downward from an end part of the ceiling portion 100_5 and having one end that comes in contact with the end part of the ceiling portion 100_5 and the other end that comes in contact with an upper end of the second side wall portion 100_3.

The light source portion 600 may serve to provide light to a display panel 150 which will be described later. In an exemplary embodiment, the light source portion 600 may be arranged on a lower part of the display panel 150 to emit light toward an upper part thereof. That is, the backlight unit according to an exemplary embodiment of the invention may be a direct type backlight unit, for example.

In an exemplary embodiment, the light source portion 600 may include a plurality of line light sources extending in a length direction. In another exemplary embodiment, the light source portion 600 may include a plurality of point light sources that are arranged in the matrix having a plurality of rows and columns.

In an exemplary embodiment, the light source portion 600 may include at least one light emitting portion. The light emitting portion may include at least one of a light emitting diode ("LED"), a cold cathode fluorescent lamp ("CCFL"), and an organic light emitting diode ("OLED"). However, the above-described light emitting portion is an exemplary embodiment, and the invention is not limited thereto.

In another exemplary embodiment, the light source portion 600 may include a printed circuit board ("PCB") and light emitting lamps mounted on the PCB. The details thereof will be described later.

The mold frame 200 may serve to accommodate the light source portion 600. In an exemplary embodiment, the mold frame 200 may serve to support a diffusion plate 130, an optical sheet 140, and the display panel 150 which will be described later.

In an exemplary embodiment, the mold frame 200 may be in a rectangular frame shape in a plan view. That is, the mold frame 200 may be in a rectangular shape having four sides, and the light source portion 600 may be arranged in a space defined by the four sides.

In an exemplary embodiment, the mold frame 200 may include a hard material. In an exemplary embodiment, the mold frame 200 may include a metal material, for example. However, the material of the mold frame 200 is not limited thereto, and the mold frame 200 may include a plastic material, for example.

The mold frame 200 includes a side wall portion 200_1 extending in a vertical direction, a seat portion 200_2 provided to project from the side wall portion 200_1, and a support 200_3 arranged at an upper end of the side wall portion 200_1.

The side wall portion 200_1 may be provided to extend in the vertical direction. The side wall portion 200_1 may be arranged on the outline of the backlight unit according to some embodiments of the invention. That is, the side wall portion 200_1 may surround other constituent elements of the backlight unit and may define a circumference of the backlight unit.

Further, in an exemplary embodiment, the lower end part of the side wall portion 200_1 may be fastened to a first side wall portion 100_2 of a support frame 100 which will be described later. That is, the inside of the side wall portion 200_1 of the mold frame 200 and the outside of the first side wall portion 100_2 of the support frame 100 may come in contact with each other to be fastened to each other. This will be described later.

The seat portion 200_2 may be provided to project in the horizontal direction from the side wall portion 200_1. That is, the seat portion 200_2 may be provided to project from the center part of the side wall portion 200_1. In an exemplary embodiment, the angle defined between the seat portion 200_2 and the side wall portion 200_1 may be about 90 degrees, but the angle defined between the seat portion 200_2 and the side wall portion 200_1 is not limited thereto.

The seat portion 200_2 may be seated on a ceiling portion 100_5 of the support frame 100 which will be described later. That is, the lower surface of the seat portion 200_2 and the upper surface of the ceiling portion 100_5 may come in contact with each other, and the seat portion 200_2 and the ceiling portion 100_5 may be fastened to each other. The details thereof will be described later.

The support 200_3 may be arranged at the upper end of the mold frame 200. The support 200_3 may serve to support the diffusion plate 130, the optical sheet 140, and the display panel 150 which will be described later. In an exemplary embodiment, the support 200_3 may have a step portion structure. When the support 200_3 has the step portion structure, the side ends and the lower ends of the display panel 150, the optical sheet 140, and the diffusion plate 130 are firmly supported by the step portion. In an exemplary embodiment, the optical sheet 140 may include diffusion sheet 140_1, a luminance improvement sheet 140_2 and a reflection polarizing sheet 140_3.

The support frame 100 may serve to support the mold frame 200 and a reflection sheet 400 which will be described later. In an exemplary embodiment, the support frame 100 may be in a rectangular frame shape that corresponds to the mold frame 200. That is, the support frame 100 may be in the rectangle shape having four sides that correspond to four side of a tetragon, and the light source portion 600 may be arranged in a space defined by the four sides.

The support frame 100 may include a bottom portion 100_1 extending in a horizontal direction, first and second side wall portions 100_2 and 100_3 extending in a vertical direction from both sides of the bottom portion 100_1 and facing each other, a ceiling portion 100_5 extending in the horizontal direction from an upper end of the first side wall portion 100_2 and facing the bottom portion 100_1, and a slant portion 100_4 slanted downward from an end part of the ceiling portion 100_5 and having one end that comes in contact with an upper end of the ceiling portion 100_5 and the other end that comes in contact with an upper end of the second side wall portion 100_3.

The bottom portion 100_1 is arranged on the lowermost part of the support frame 100 to support other constituent elements of the support frame 100. The bottom portion 100_1 may include a flat surface that extends in the horizontal direction.

The first side wall portion 100_2 and the second side wall portion 100_3 may be provided to extend in the vertical direction from both sides of the bottom portion 100_1. The first side wall portion 100_2 and the second side wall portion 100_3 may face each other. However, the extension lengths of the first side wall portion 200_2 and the second side wall portion 100_3 may differ from each other. That is, the extension length of the first side wall portion 100_2 may be larger than the extension length of the second side wall portion 100_3. Accordingly, the slant portion 100_4 which will be described later may be provided.

The ceiling portion 100_5 may be provided to extend in the horizontal direction from the upper end of the first side wall portion 100_2. That is, the ceiling portion 100_5 may face the bottom portion 100_1.

The slant portion 100_4 may be provided to be slanted downward from the end part of the ceiling portion 100_5.

That is, the slant portion 100_4 may be provided to be downwardly slanted from the outside to the inside of the backlight unit.

One end of the slant portion 100_4 may come in contact with the end part of the ceiling portion 100_5, and the other end of the slant portion 100_4 may come in contact with the upper end of the second side wall portion 100_3. Accordingly, the cross section of the support frame 100 may be in a closed polygonal shape through the bottom portion 100_1, the first side wall portion 100_2, the second side wall portion 100_3, the ceiling portion 100_5, and the slant portion 100_4.

A cavity may be defined, which is an inner space that is defined by the bottom portion 100_1, the first side wall portion 100_2, the second side wall portion 100_3, the ceiling portion 100_5, and the slant portion 100_4. That is, the cavity may be a space between the bottom portion 100_1 and the ceiling portion 100_5 or a space between the first side wall portion 100_2 and the second side wall portion 100_3.

The cavity may extend along the extension direction of the support frame 100. That is, in an exemplary embodiment, the support frame 100 may be provided to extend in the length direction, and the cavity may extend along the support frame 100.

When the cavity is defined in the support frame 100, the total weight of the support frame 100 may be reduced. Accordingly, the total weight of the backlight unit can be reduced.

The reflection sheet 400 may be arranged on the lower part of the light source portion 600. The reflection sheet 400 may serve to guide light, which is emitted from the light source portion 600 and is directed to the lower part of the backlight unit, to the upper part thereof again. That is, the reflection sheet 400 guides the light, which is emitted from the light source portion 600 to the lower part of the backlight unit, to the display panel 150 again to reduce a light loss.

In an exemplary embodiment, the reflection sheet 400 may include polyethylene terephthalate ("PET"), but the material of the reflection sheet 400 is not limited thereto. In another exemplary embodiment, the reflection sheet 400 may include crystalline PET resin.

The reflection sheet 400 that is arranged on the lower part of the light source portion 600 may extend to be bent toward the support frame 100. That is, the reflection sheet 400 may include a bent portion, and may extend to be slanted upward at a predetermined angle from the bent portion. For convenience in explanation, the upwardly slanted portion of the reflection sheet 400 is referred to as a slant region 400_2, and one end of the slant region 400_2 which meets the horizontal region of the reflection sheet 400 is referred to as a slant point 400_1.

In an exemplary embodiment, the slant region 400_2 may be supported by the slant portion 100_4 of the support frame 100. In this case, the slope of the slant portion 100_4 of the support frame 100 may be substantially equal to the slope of the slant region 400_2.

The end part of the slant region 400_2 may be arranged adjacent to the support frame 100. That is, the end part of the slant region 400_2 that is supported by the slant portion 100_4 of the support frame 100 may continuously extend to come in contact with the side wall portion 200_1 of the mold frame 200.

Hereinafter, detailed embodiments of the invention will be described. In the following embodiments, the same reference numerals are used for the same constituent elements as the constituent elements as described above, and the duplicate explanation thereof will be omitted.

Figure 2:
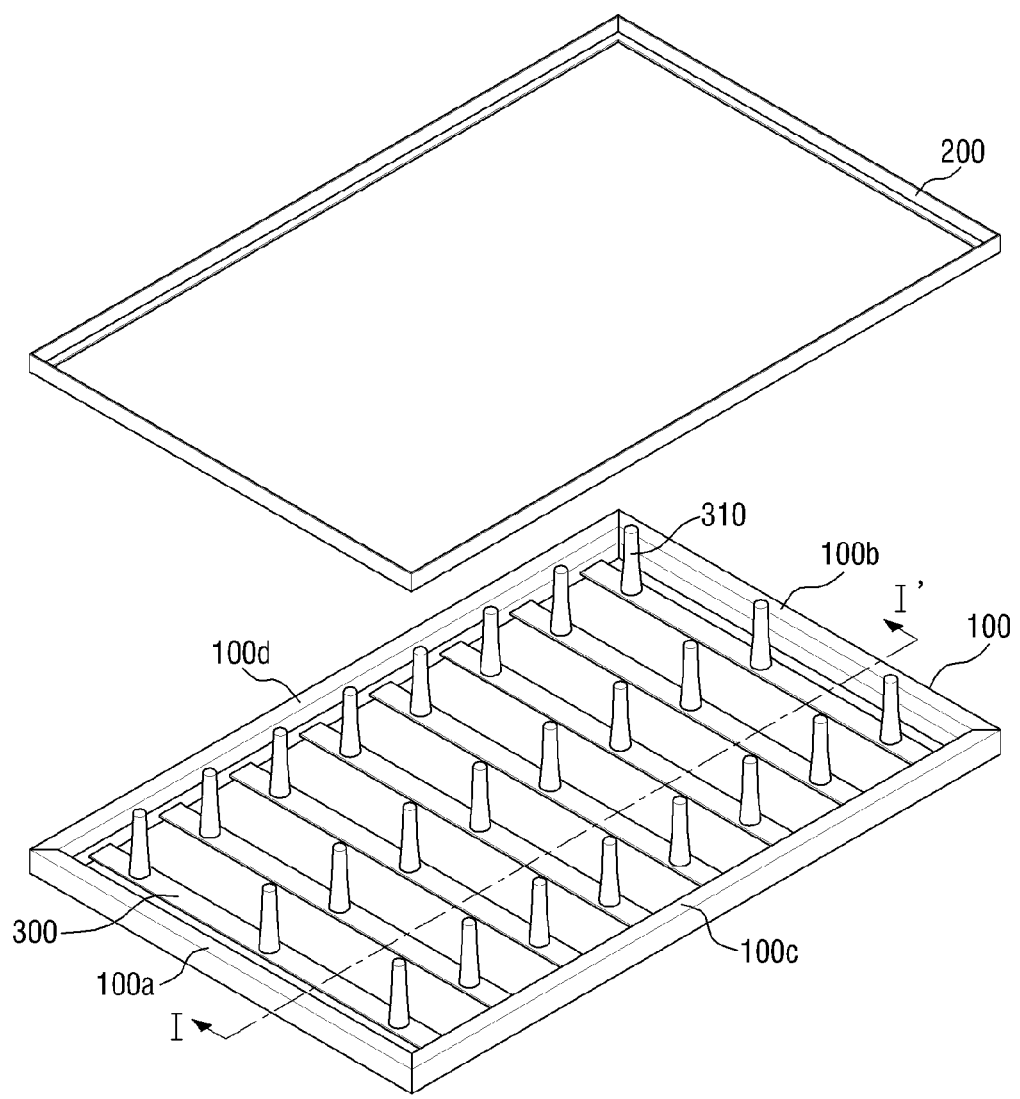
FIG. 2 is a partial exploded perspective view of an another exemplary embodiment of a backlight unit according to the invention.
Figure 3:
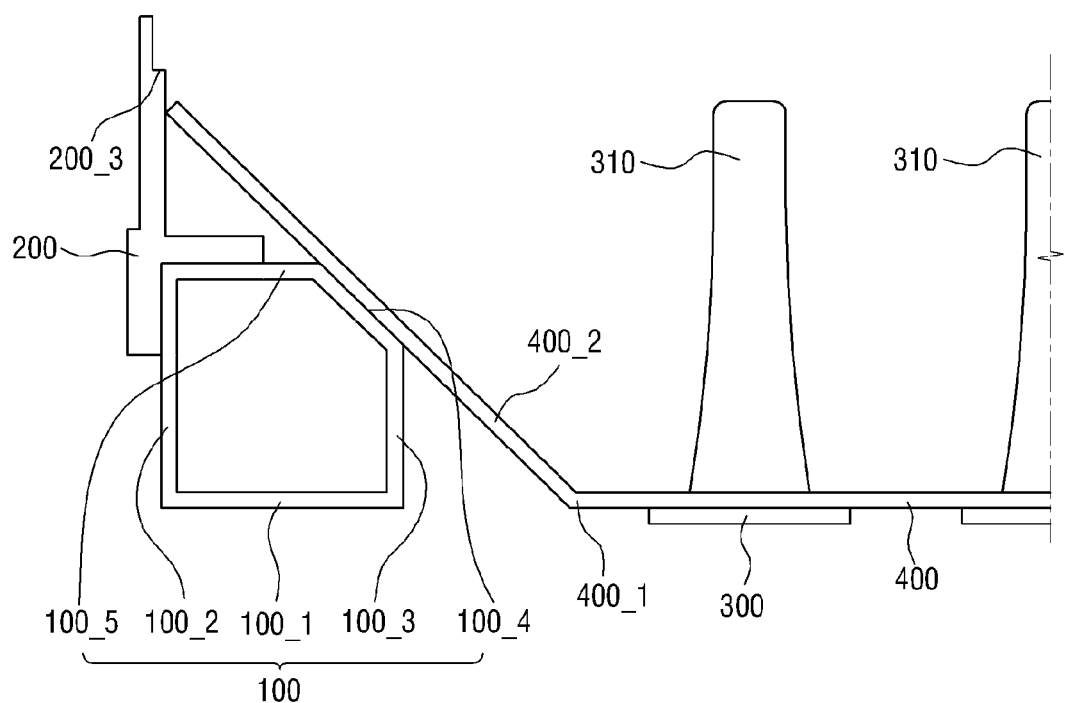
FIG. 3 is a cross-sectional view taken along lint I-I' of FIG. 2.

FIG. 2 is a partial exploded perspective view of a backlight unit according to another exemplary embodiment of the invention, and FIG. 3 is a cross-sectional view taken along lint I-I' of FIG. 2.

Referring to FIGS. 2 and 3, a backlight unit according to another exemplary embodiment of the invention is different from the backlight unit according to the exemplary embodiment of FIG. 1 in that it includes at least one support bar that crosses facing support frames.

The support bar 300 may serve to support a reflection sheet 400 that is arranged on the support bar 300. In an exemplary embodiment of the invention as described above, the backlight unit omits the bottom chassis to reduce the weight. In other words, the reflection sheet 400 may be supported by the slant portion 100_4 of the support frame 100, or may maintain the shape by a stress of the material itself.

In contrast, when the support bar 300 is arranged between the facing support frames 100 according to another exemplary embodiment of the invention, the reflection sheet 400 can be supported more stably.

The support bar 300 may be arranged to cross the facing sides of the support frames 100. That is, in an exemplary embodiment in which the support frame 100 is in a rectangular frame shape, the support bar 300 may be arranged to cross two facing sides of the support frames 100. That is, in exemplary embodiment in which the support frame 100 includes a first side 100a, a second side 100b, a third side 100c, and a fourth side 100d, the support bar 300 may be in parallel to the first side 100a and the second side 100b, and may be perpendicular to the third side 100c and the fourth side 100d. That is, one end of the support bar 300 may be fastened to the third side 100c, and the other end thereof may be fastened to the fourth side 100d. A plurality of support bars 300 may be spaced apart at predetermined intervals and may be arranged in parallel to each other. FIG. 2 exemplarily illustrates that eight support bars 300 are arranged. However, this is an exemplary embodiment, and the number of support bars 300 is not limited thereto.

In an exemplary embodiment, the support bar 300 may include a rigid material, for example. That is, the support bar 300 may be provided to include a metal material, but is not limited thereto. In another exemplary embodiment, the support bar 300 may include a plastic material, for example.

At least one support column 310 may be disposed on the support bar 300.

The support column 310 may serve to support the diffusion plate 130 which will be described later. The support column 310 may be provided to project vertically from the support bar 300.

In an exemplary embodiment, the support column 310 that is arranged on the one support bar 300 may be aligned along the length direction of the support bar 300. FIG. 2 exemplarily illustrates that three support columns 310 are disposed on one support bar 300, but the number of support columns 310 is not limited thereto.

Although not illustrated in the drawing, in an exemplary embodiment in which the support columns 310 are arranged, the reflection sheet 400 may include insertion ports that correspond to the support columns 310. That is, the support columns 310 may be inserted into the insertion ports of the reflection sheet 400, and thus the reflection sheet 400 may be supported to come in contact with the support bars 300.

That is, the support column 310 may penetrate the insertion ports of the reflection sheet 400 to support the diffusion plate 150.

Figure 4:
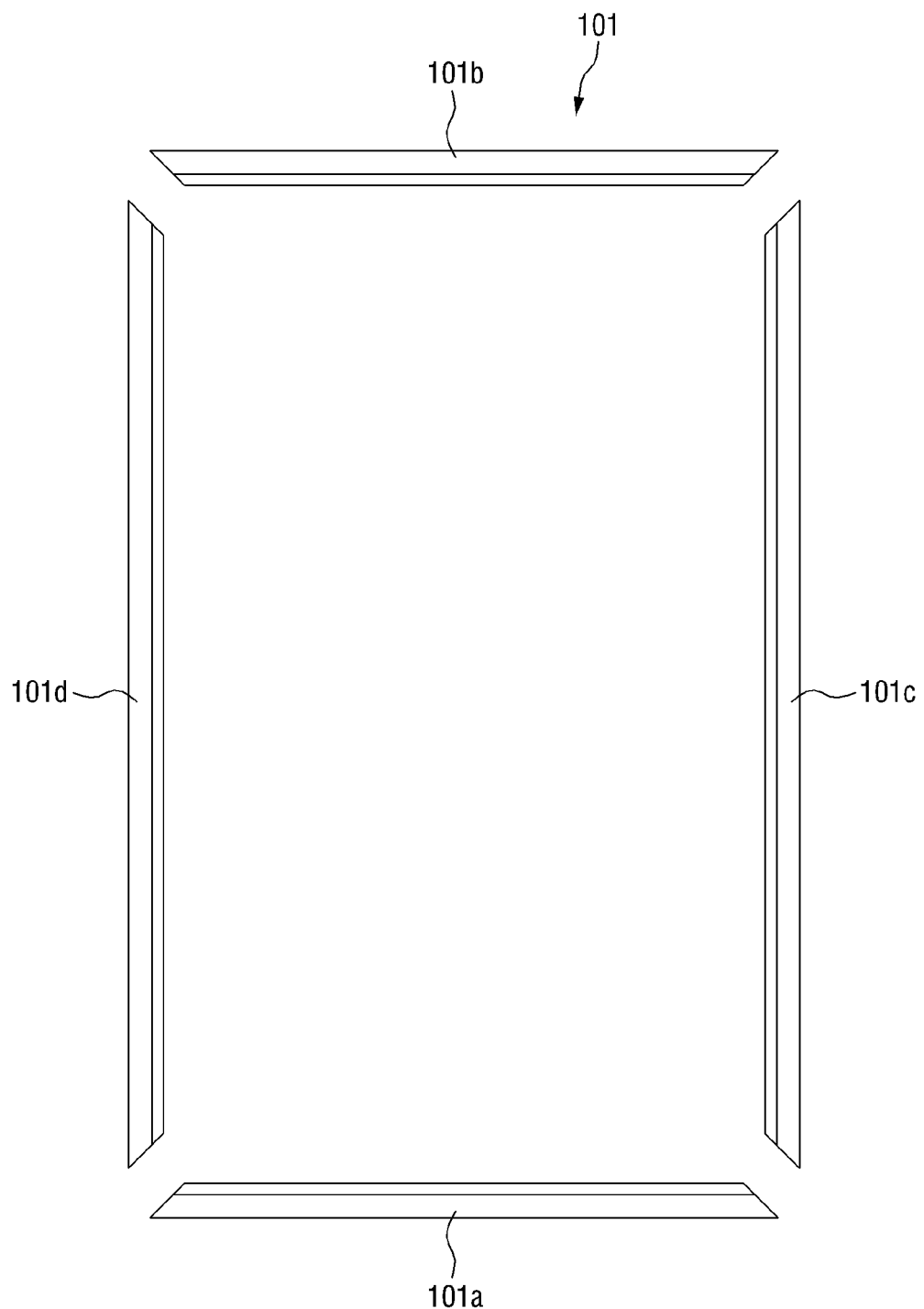
FIG. 4 is a partial perspective view of a backlight unit according to still another exemplary embodiment of the invention.
Figure 5:
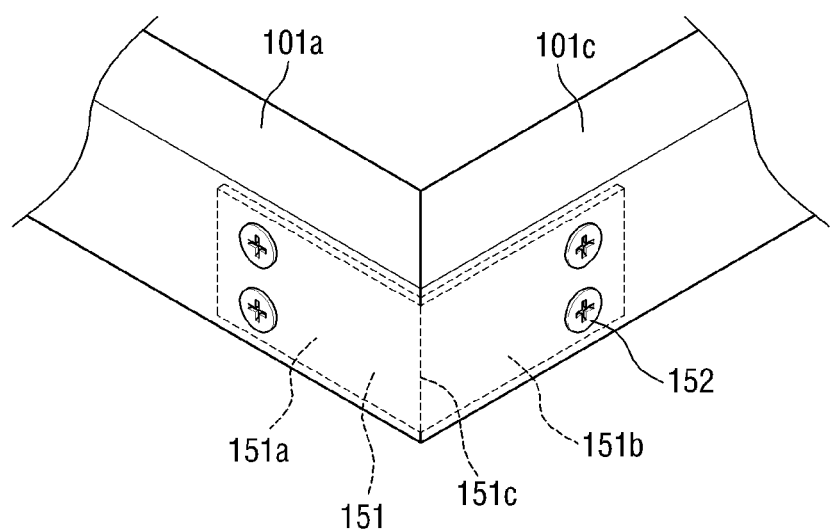
FIG. 5 is a partial enlarged view of the backlight unit of FIG. 4.

FIG. 4 is a partial perspective view of a backlight unit according to still another exemplary embodiment of the invention. FIG. 5 is a partial enlarged view of the backlight unit of FIG. 4, and FIG. 6 is an exploded perspective view of FIG. 5.

Figure 6:
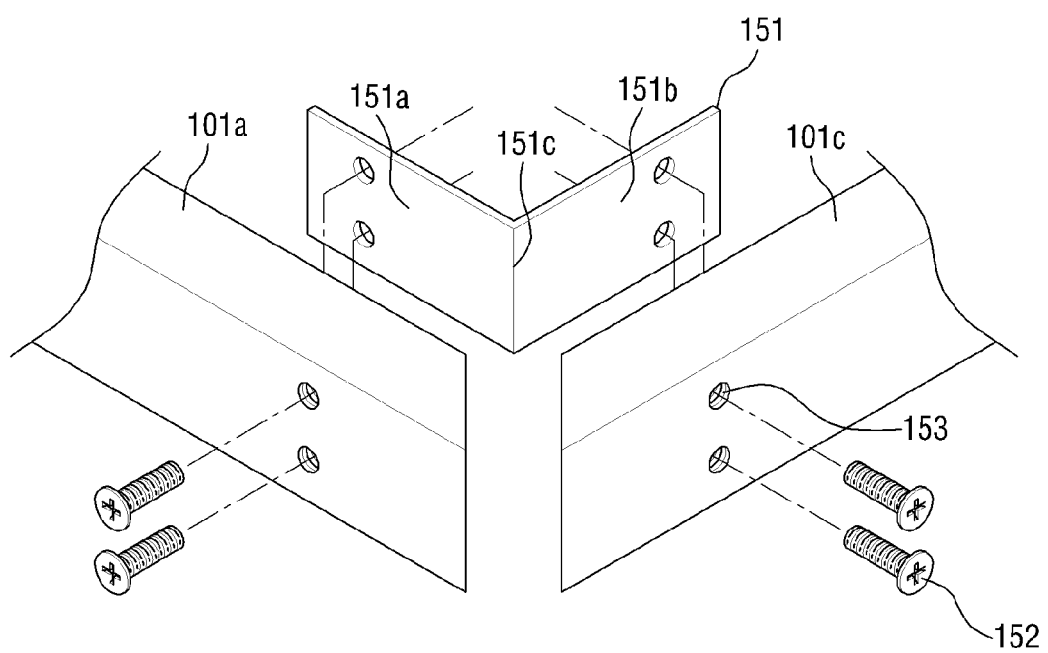
FIG. 6 is an exploded perspective view of FIG. 5.

Referring to FIGS. 4 to 6, a backlight unit according to still another exemplary embodiment of the invention is different from the backlight unit according to the exemplary embodiment of FIG. 1 in that a support frame includes four separated sub-support frames.

In an exemplary embodiment, a support frame 101 may include four separated sub-support frames. That is, four sub-support frames having a bar shape may be combined to provide a support frame 101 having a rectangular frame shape.

For convenience in explanation, the four sub-support frames are called a first sub-support frame 101a, a second sub-support frame 101b, a third sub-support frame 101c, and a fourth sub-support frame 101d.

Further, the sub-support frame may have substantially the same structure as the structure of the support frame 100 according to an exemplary embodiment of the invention as described above. That is, the sub-support frame may have a bottom portion, a first side wall portion, a second side wall portion, a ceiling portion, and a slant portion. Since the structure has been described with reference to FIG. 1, the detailed explanation thereof will be omitted.

In an exemplary embodiment, the first sub-support frame 101a may face the to second sub-support frame 101b, and the third sub-support frame 101c may face the fourth sub-support frame 101d.

That is, the first sub-support frame 101a and the second sub-support frame 101b may be parallel to each other, the third sub-support frame 101c and the fourth sub-support frame 101d may be parallel to each other, and the first sub-support frame 101a and the third sub-support frame 101c may be perpendicular to each other.

Further, one end of the first sub-support frame 101a may be fastened to the third sub-support frame 101c, and the other end thereof may be fastened to the fourth sub-support frame 101d. In the same manner, one end of the second sub-support frame 101b may be fastened to the third sub-support frame 101c, and the other end thereof may be fastened to the fourth sub-support frame 101d.

A method for fastening the respective sub-support frames will be described with reference to FIGS. 5 and 6.

In an exemplary embodiment, the sub-support frames may be fastened by an "L"-shaped fastening member. For convenience in explanation, the above structure is referred to as an L-type fastening member 151. Specifically, in a state where the end part of the first sub-support frame 101a and the end part of the third sub-support frame 101c come in contact with each other, the L-type fastening member 151 may come in contact with the inner surface of the first sub-support frame 101a and the inner surface of the third sub-support frame 101c. That is, the first sub-support frame 101a and the third sub-support frame 101c are divided based on a bend line 151c, and the first sub-support frame 101a and the third sub-support frame 101c may be fixed by fastening one side 151a to the inner surface of the first sub-support frame 101a and fastening the other side 151b thereof to the inner surface of the third sub-support frame 101c, respectively.

In an exemplary embodiment, the L-type fastening member 151 and the respective sub-support frames may be fastened in a screw fitting method. FIGS. 4 and 5 exemplify a case where the L-type fastening member 151 and the respective sub-support frames are fastened using two screws 152. However, the invention is not limited thereto, and the number of screws 151 is not limited thereto.

Further, in the case of fastening the L-type fastening member 151 and the respective sub-support frames using the screws 152, engagement ports 153 (refers to FIG. 6) that correspond to the screws 152 may be defined in the side surfaces of the respective sub-support frames.

FIGS. 5 and 6 exemplify a case where the first sub-support frame 101a and the third sub-support frame 101c are fastened. However, other sub-support frames can be fastened in substantially the same manner.

Figure 7:
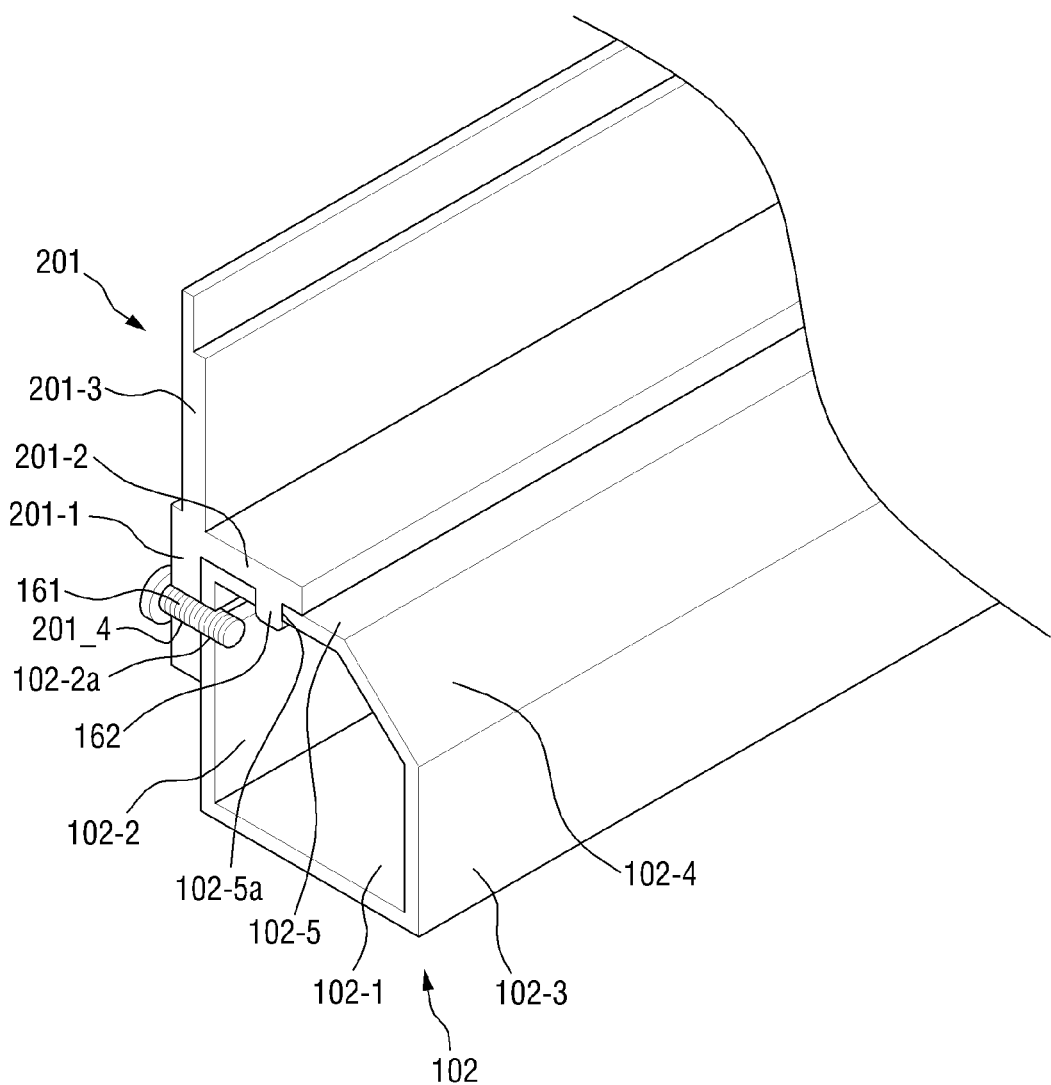
FIG. 7 is a partial perspective view of a backlight unit according to still another exemplary embodiment of the invention.
Figure 8:
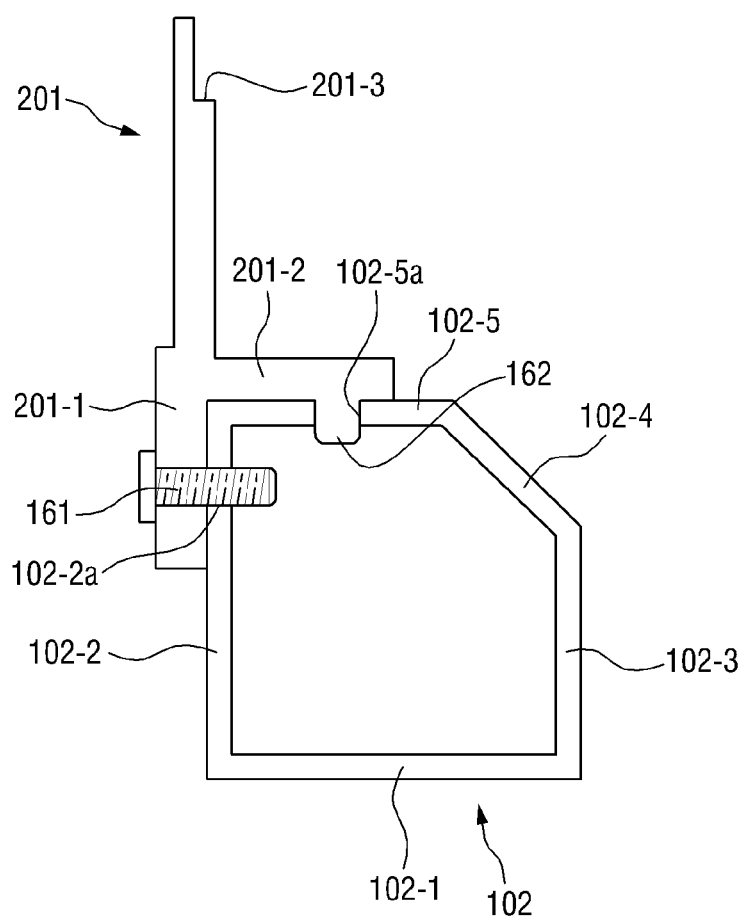
FIG. 8 is a cross-sectional view of the backlight unit of FIG. 7.

FIG. 7 is a partial perspective view of a backlight unit according to still another exemplary embodiment of the invention, and FIG. 8 is a cross-sectional view of the backlight unit of FIG. 7.

Referring to FIGS. 7 and 8, a backlight unit according to still another exemplary embodiment of the invention is different from the backlight unit according to the exemplary embodiment of FIG. 1 in that a mold frame and a support frame are fastened by a fastening projection arranged on a lower surface of a seat portion and an engagement screw that penetrates a side wall portion of the mold frame and a first side wall portion of the support frame.

The support frame 102 includes a bottom portion 102_1, first and second side wall portions 102_2 and 102_3 provided to extend upward from both sides of the bottom portion 102_1 and facing each other, a ceiling portion 102_5 provided to extend in a horizontal direction from an upper end of the first side wall portion 102_2, and a slant portion 102_4 slanted downward from an end part of the ceiling portion 102_5 and having one end that comes in contact with the end part of the ceiling portion 102_5 and the other end that comes in contact with an upper end of the second side wall portion 102_3.

The mold frame 201 includes a side wall portion 201_1 extending in a vertical direction, a seat portion 201_2 provided to project from the side wall portion 201_1, and a support 201_3 arranged at an upper end of the side wall portion 200_1

As described above, a side wall portion 201_1 of a mold frame 201 may be fastened to a first side wall portion 102_2 of a support frame 102, and a seat portion 201_2 of the mold frame 201 may be fastened to a ceiling portion 102_5 of the support frame 102.

In an exemplary embodiment, the side wall portion 201_1 of the mold frame 201 may be fastened to the first side wall portion 102_2 of the support frame 102 by an engagement screw 161 that penetrates the side wall portion 201_1 of the mold frame 201 and the first side wall portion 102_2 of the support frame 102. The engagement screw 161 may be inserted from the outside of the side wall portion 201_1 of the mold frame 201 into the inside of the first side wall portion 102_2 of the support frame 102. That is, a head part of the engagement screw 162 may be arranged on the outside of the side wall portion 201_1 of the mold frame 201, and a body part of the engagement screw 162 may be inserted into the inside of the first side wall portion 102_2 of the support frame 102.

In this regard, engagement holes 201_4 and 102_2a that correspond to the engagement screw 161 may be defined in the side wall portion 201_1 of the mold frame 201 and the first side wall portion 102_2 of the support frame 102, respectively. The engagement hole 201_4 that is defined in the side wall portion 201_1 of the mold frame 201 may overlap the engagement hole 102_2a that is defined in the first side wall portion 102_2 of the support frame 102. Accordingly, the side wall portion 201_1 of the mold frame 201 and the first side wall portion 102_2 of the support frame 102 may be engaged with each other by one engagement screw 161.

A fastening projection 162 may be disposed on the seat portion 201_2 of the mold frame 201. That is, the fastening projection 162 may be disposed to project by a predetermined distance from the lower surface of the seat portion 201_2. A fastening hole 102_5a may be defined in the ceiling portion 102_5 of the support frame 102 to correspond to the fastening projection 162. The size of the fastening hole 102_5a may be substantially equal to or smaller than the size of the fastening projection 162. In an exemplary embodiment, since the fastening projection 162 and the fastening hole 102_5a are fastened by interference fitting, the seat portion 201_2 of the mold frame 201 and the ceiling portion 102_5 of the support frame 102 may be fastened to each other.

Figure 9:
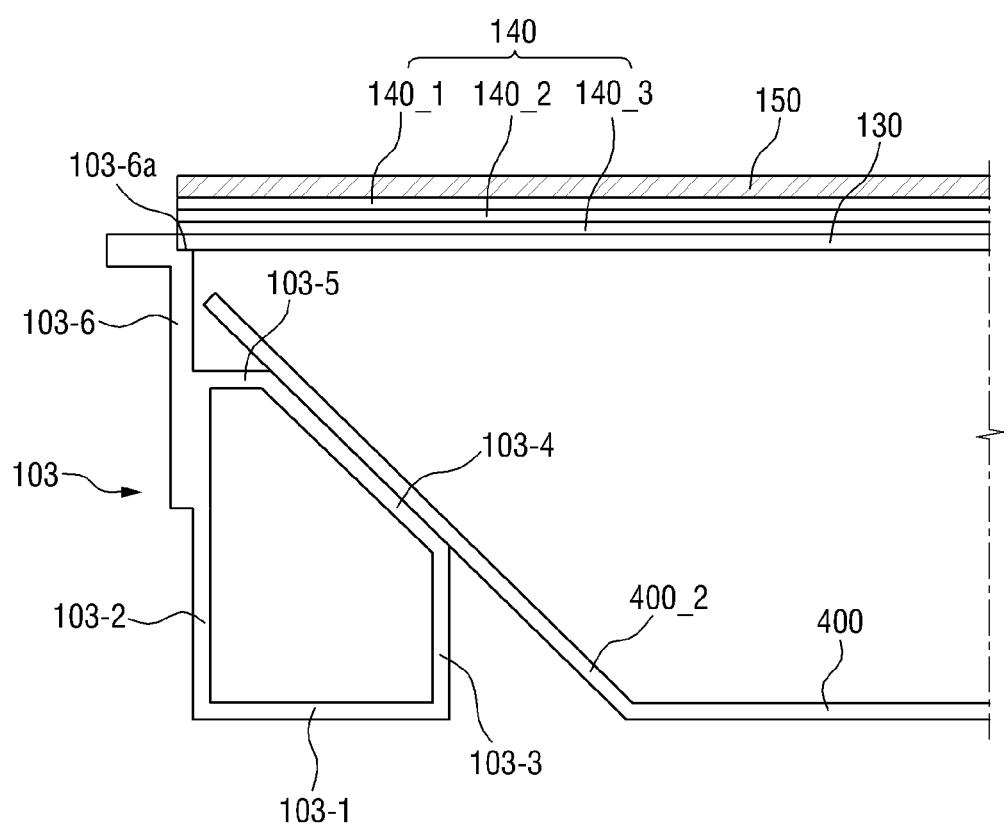
FIG. 9 is a partial cross-sectional view of a backlight unit according to still another exemplary embodiment of the invention.

FIG. 9 is a partial cross-sectional view of a backlight unit according to still another exemplary embodiment of the invention.

Referring to FIG. 9, a backlight unit according to still another exemplary embodiment of the invention is different from the backlight unit according to the exemplary embodiment of FIG. 1 in that a mold frame and a support frame are provided in a body.

In an exemplary embodiment, a support frame 103 may be integrally provided with a mold frame. That is, the support frame 103 having a modified shape may serve as the mold frame.

The support frame 103 includes a bottom portion 103_1, first and second side wall portions 103_2 and 103_3 provided to extend upward from both sides of the bottom portion 103_1 and facing each other, a ceiling portion 103_5 provided to extend in a horizontal direction from an upper end of the first side wall portion 103_2, and a slant portion 103_4 slanted downward from an end part of the ceiling portion 103_5 and having one end that comes in contact with the end part of the ceiling portion 103_5 and the other end that comes in contact with an upper end of the second side wall portion 103_3.

In this regard, a side wall portion 103_6 of the mold frame may be provided to extend in the vertical direction from an upper end of a first side wall portion 103_2. A support 103_3 may be arranged at an upper end of the side wall portion 103_6 of the mold frame, and the support 103_6 may be substantially the same as the support of the mold frame of the backlight unit according to some embodiments of the invention.

The support 103-6a may be arranged at the upper end of the support 103_6. The support 103-6a may serve to support the diffusion plate 130, the optical sheet 140, and the display panel 150 which will be described later. In an exemplary embodiment, the support 103-6a may have a step portion structure. When the support 103-6a has the step portion structure, the side ends and the lower ends of the display panel 150, the optical sheet 140, and the diffusion plate 130 are firmly supported by the step portion.

Figure 10:
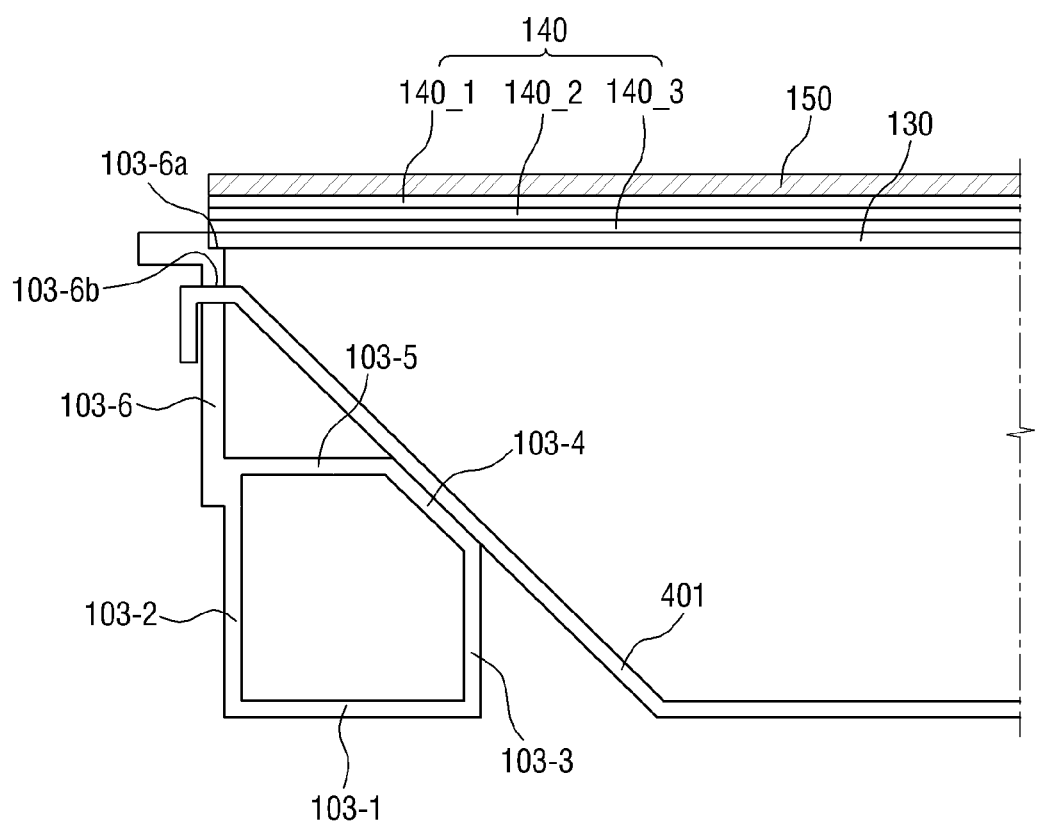
FIG. 10 is a partial cross-sectional view of a backlight unit according to still another exemplary embodiment of the invention.

FIG. 10 is a partial cross-sectional view of a backlight unit according to still another exemplary embodiment of the invention.

Referring to FIG. 10, a backlight unit according to still another exemplary embodiment of the invention is different from the backlight unit according to the exemplary embodiment of FIG. 1 in that a side wall portion of a mold frame further includes a fixing hole 103_6b for fastening an end part of a reflection sheet 401.

As described above, the reflection sheet 401 may extend to be bent and may be supported by a slant portion 103_4 of a support frame 103. An end part of the reflection sheet 401 may be arranged adjacent to a mold frame or a side wall portion 103_6 of the mold frame.

In an exemplary embodiment, an end part of the reflection sheet 401 may be inserted into the fixing hole 103_6b defined on the side wall portion 103_6 of the mold frame to be fixed. Accordingly, the reflection sheet 401 can be fixed more firmly.

Since other elements of the support frame 103 have the same structure with those of the support frame 103 described with reference to FIG. 9, the detailed explanation thereof will be omitted.

Figure 11:
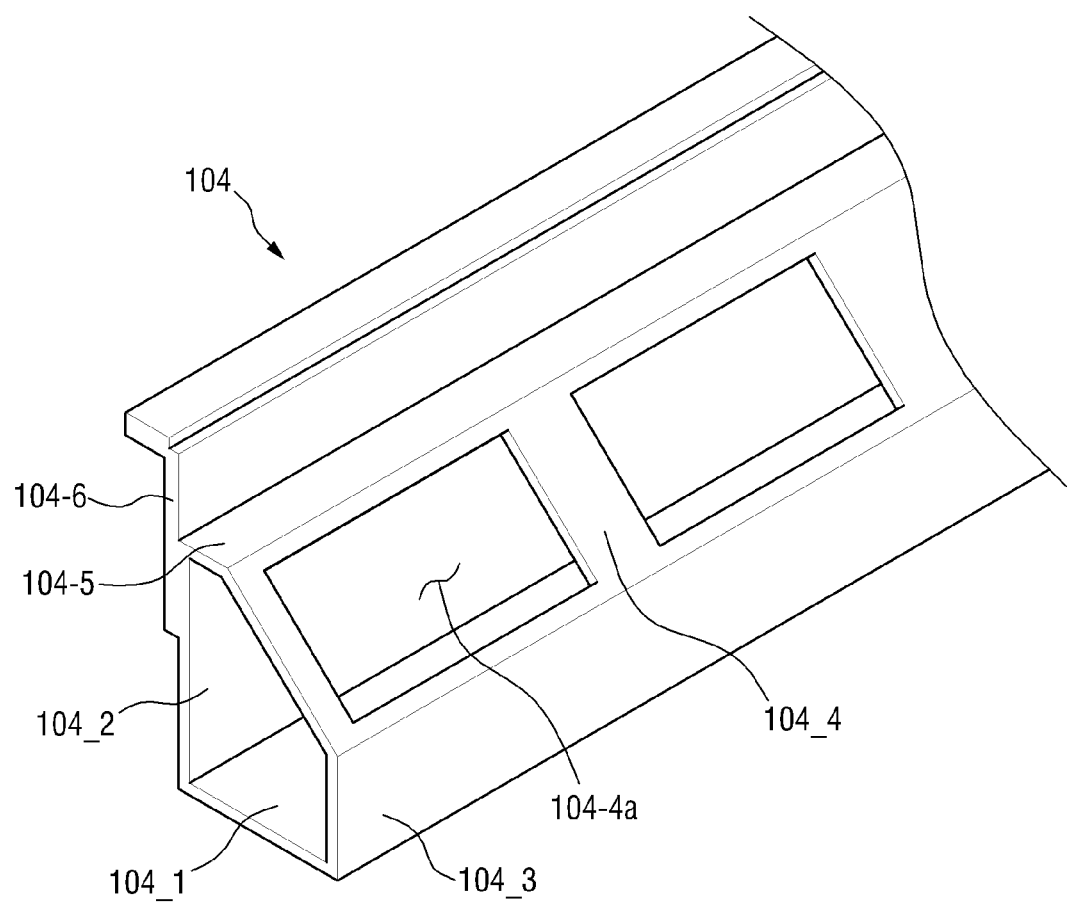
FIG. 11 is a partial cross-sectional view of a backlight unit according to still another exemplary embodiment of the invention.

FIG. 11 is a partial cross-sectional view of a backlight unit according to still another exemplary embodiment of the invention.

Referring to FIG. 11, a backlight unit according to still another exemplary embodiment of the invention is different from the backlight unit according to the exemplary embodiment of FIG. 1 in that at least one opening is defined in a slant portion 104_4 of a support frame 104.

The support frame 104 includes a bottom portion 104_1, first and second side wall portions 104_2 and 104_3 provided to extend upward from both sides of the bottom portion 104_1 and facing each other, a ceiling portion 104_5 provided to extend in a horizontal direction from an upper end of the first side wall portion 104_2, and a slant portion 104_4 slanted downward from an end part of the ceiling portion 104_5 and having one end that comes in contact with the end part of the ceiling portion 104_5 and the other end that comes in contact with an upper end of the second side wall portion 104_3.

In this regard, a side wall portion 104_6 of the mold frame may be provided to extend in the vertical direction from an upper end of a first side wall portion 104_2. A support 104_3 may be arranged at an upper end of the side wall portion 104_6 of the mold frame, and the support 104_6 may be substantially the same as the support of the mold frame of the backlight unit according to some embodiments of the invention.

In an exemplary embodiment, at least one opening 104_4a may be defined in a slant portion 104_4 of the support frame 104. FIG. 11 exemplifies that the opening 104_4a is in a rectangular shape, but the shape of the opening 104_4a is not limited thereto. In another exemplary embodiment, the opening 104_4a may have a circular shape or a shape including a curve at least partly.

In an exemplary embodiment, a plurality of openings 104_4a may be arranged at predetermined intervals. When the opening 104_4a is defined in the slant portion 104_4, the total weight of the support frame 104 may be relatively reduced. Accordingly, the total weight of the backlight unit may be reduced.

Figure 12:
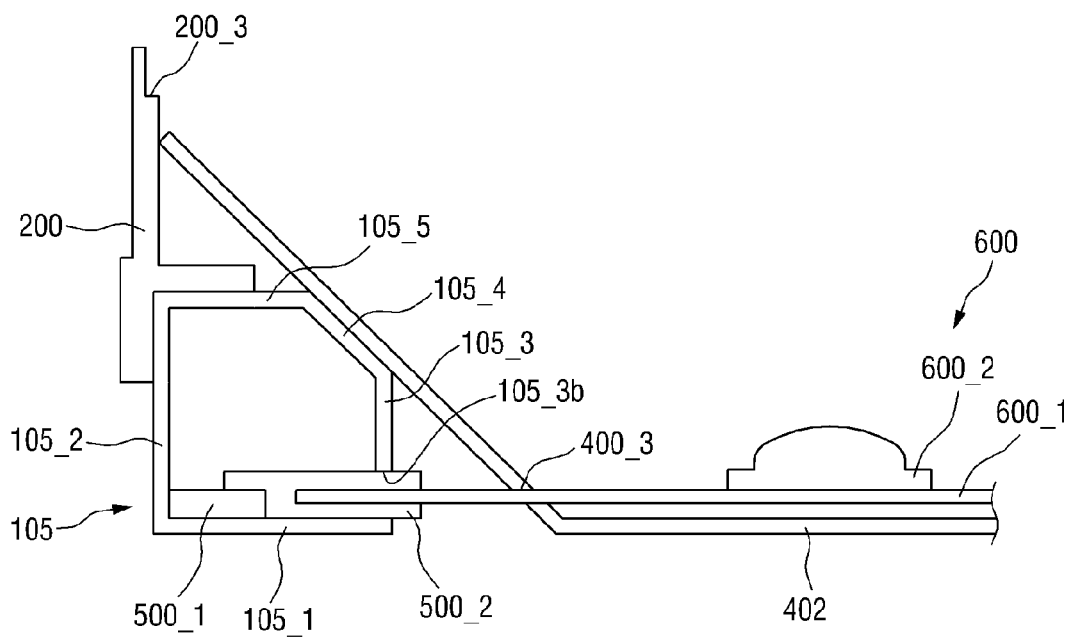
FIG. 12 is a partial cross-sectional view of a backlight unit according to still another exemplary embodiment of the invention.
Figure 13:
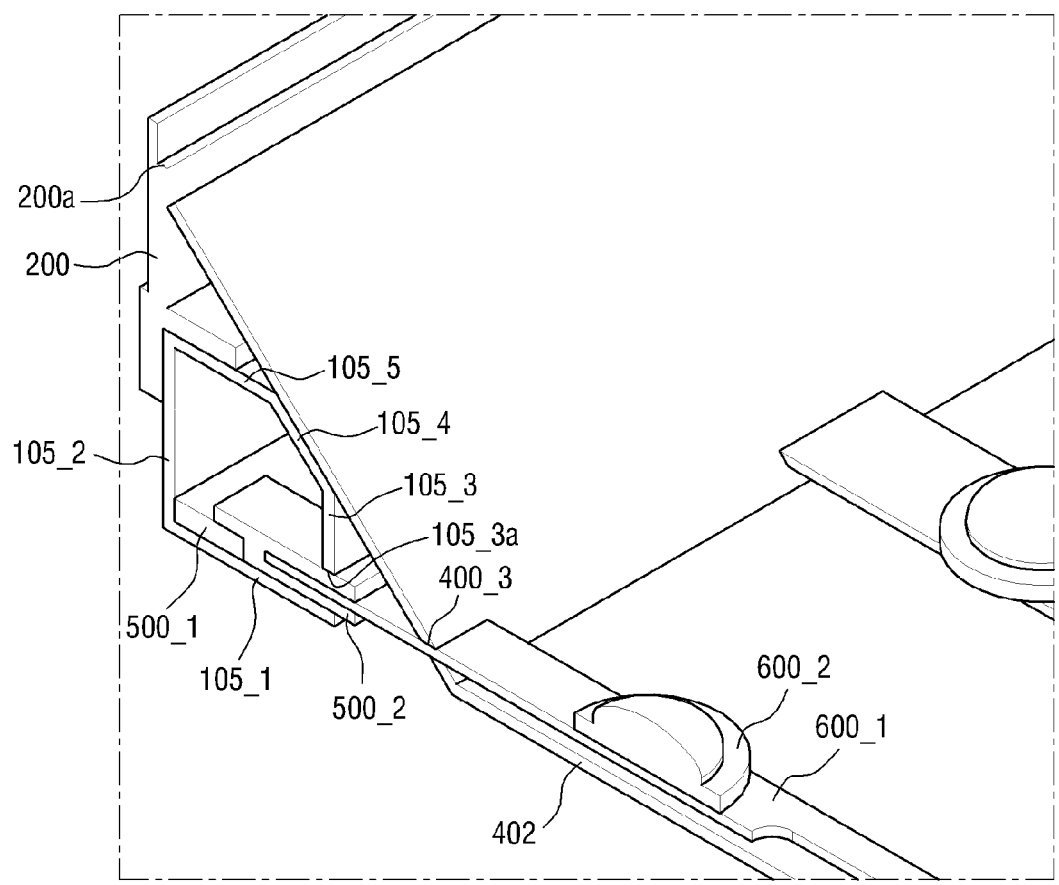
FIG. 13 is a partial perspective view of the backlight unit of FIG. 12.

Since other elements of the support frame 104 have the same structure with those of the support frame 103 described with reference to FIG. 9, the detailed explanation thereof will be omitted FIG. 12 is a partial cross-sectional view of a backlight unit according to still another exemplary embodiment of the invention. FIG. 13 is a partial perspective view of the backlight unit of FIG. 12, and FIG. 14 is a partial perspective view of the backlight unit of FIG. 12.

Figure 14:
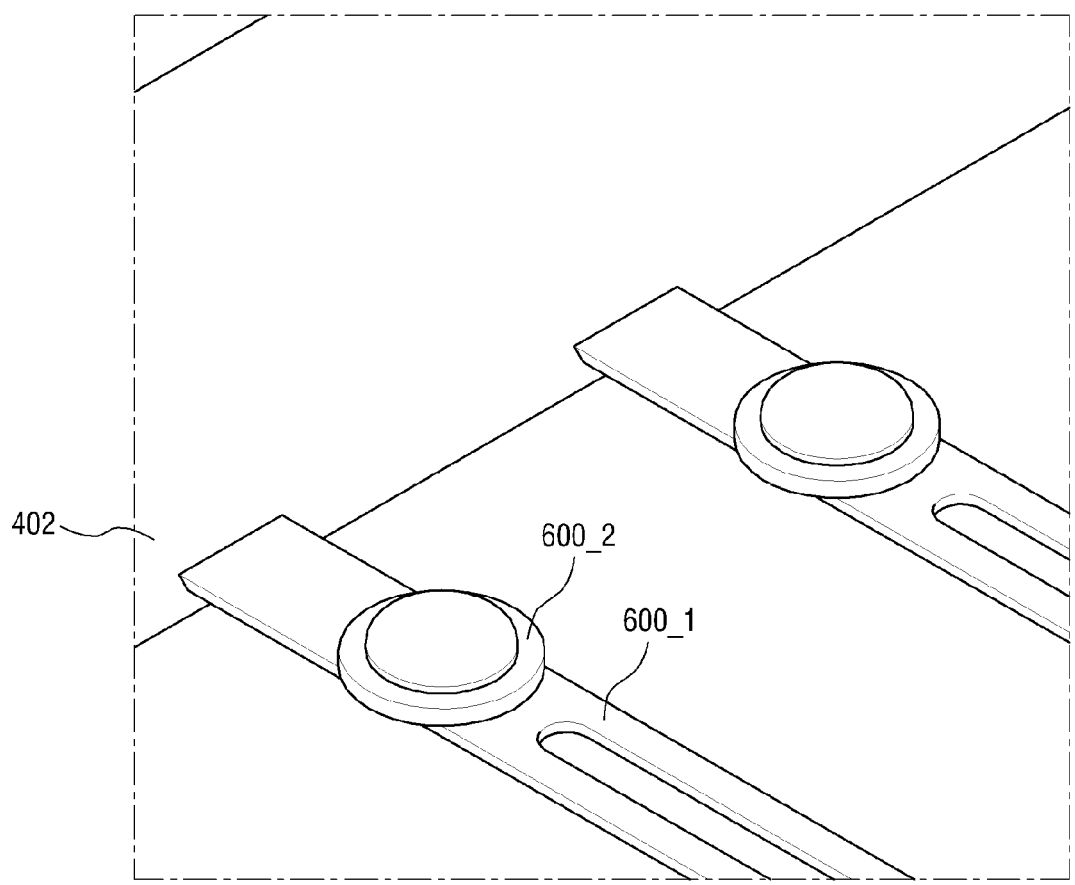
FIG. 14 is a partial perspective view of the backlight unit of FIG. 12.

Referring to FIGS. 12 to 14, a backlight unit according to still another exemplary embodiment of the invention is different from the backlight unit according to the exemplary embodiment of FIG. 1 in that a light source portion includes a first PCB and light emitting lamps mounted on the first PCB.

The support frame 105 includes a bottom portion 105_1, first and second side wall portions 105_2 and 105_3 provided to extend upward from both sides of the bottom portion 105_1 and facing each other, a ceiling portion 105_5 provided to extend in a horizontal direction from an upper end of the first side wall portion 105_2, and a slant portion 105_4 slanted downward from an end part of the ceiling portion 105_5 and having one end that comes in contact with the end part of the ceiling portion 105_5 and the other end that comes in contact with an upper end of the second side wall portion 105_3.

In this regard, a side wall portion 104_6 of the mold frame may be provided to extend in the vertical direction from an upper end of a first side wall portion 104_2. A support 104_3 may be arranged at an upper end of the side wall portion 104_6 of the mold frame, and the support 104_6 may be substantially the same as the support of the mold frame of the backlight unit according to some embodiments of the invention.

In an exemplary embodiment, a light source portion 600 may include a first PCB 600_1 of a bar shape that extends in the length direction and a plurality of light emitting lamps 600_2 mounted on the first PCB 600_1.

A plurality of first PCBs 600_1 may be arranged in a line to be spaced apart from each other at predetermined intervals.

The first PCB 600_1 may transfer a signal for controlling the light emitting lamps 600_2 mounted on the first PCB 600_1 or may transfer a power to the light emitting lamps 600_2. The first PCB 600_1 may be electrically connected to the second PCB 500_1 which will be described later, through an opening 400_3 defined in a reflection sheet 402 and may receive a control signal that is output from the second PCB 500_1 to control the light emitting lamps 600_2.

In an exemplary embodiment, the first PCB 600_1 may be arranged to be in parallel to the third side and the fourth side of a support frame 105 and perpendicular to the first side and the second side. In an exemplary embodiment in which the backlight unit further includes support bars, the support bars and the first PCB 600_1 may perpendicularly cross each other.

In exemplary embodiments of the invention, the backlight unit may further include a second PCB 500_1 and connection sockets 500_2 electrically connecting the second PCB 500_1 and the first PCB 600_1 to each other. Further, an insertion groove 105_3a (refers to FIG. 15) and a connection socket insertion groove 105_3b may be defined in a second side wall portion 105_3. This will be described in more detail with reference to FIGS. 15 to 17.

Figure 15:
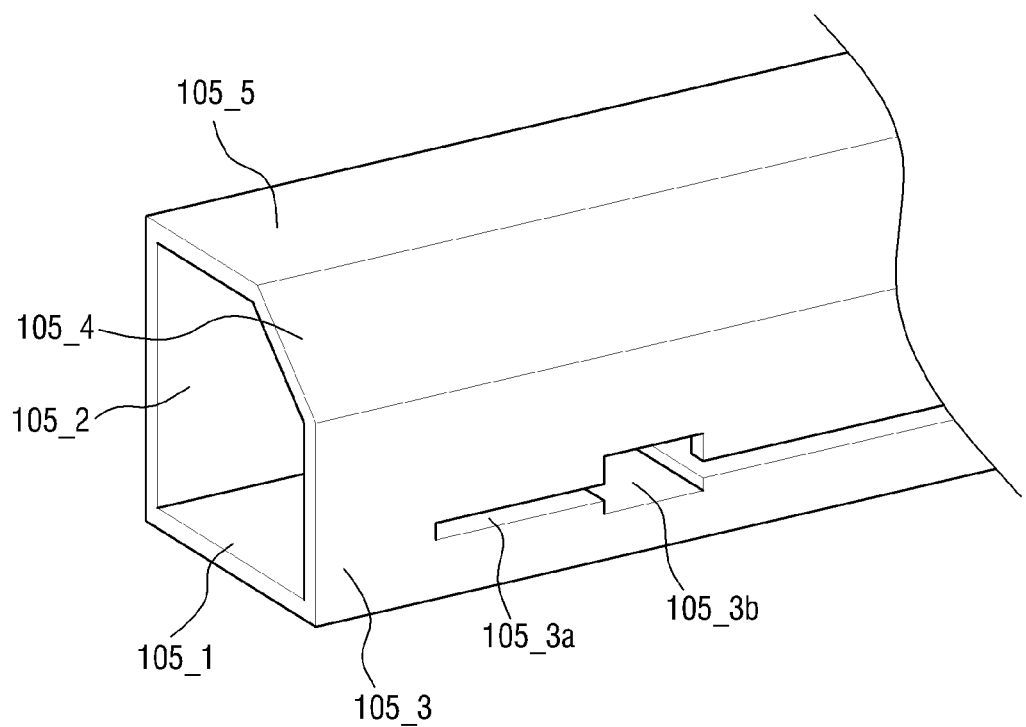
FIG. 15 is a partial perspective view of a backlight unit according to still another exemplary embodiment of the invention.
Figure 16:
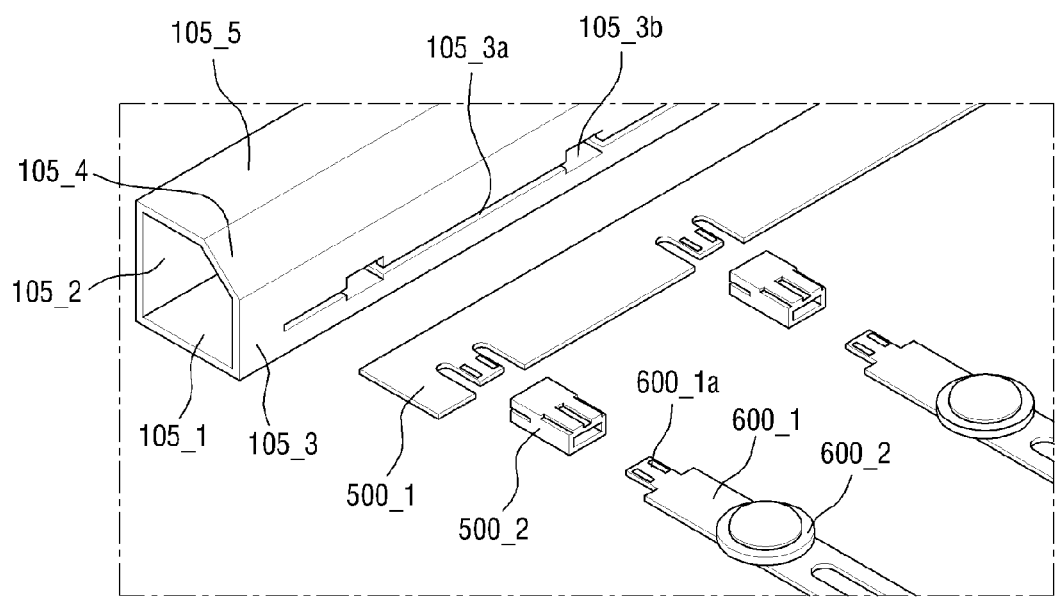
FIG. 16 is an exploded perspective view of the backlight unit according to the exemplary embodiment of FIG. 15.

FIG. 15 is a partial perspective view of a backlight unit according to still another exemplary embodiment of the invention. FIG. 16 is an exploded perspective view of the backlight unit according to the exemplary embodiment of FIG. 15, and FIG. 17 is a perspective view of the backlight unit according to the exemplary embodiment of FIG. 15.

Figure 17:
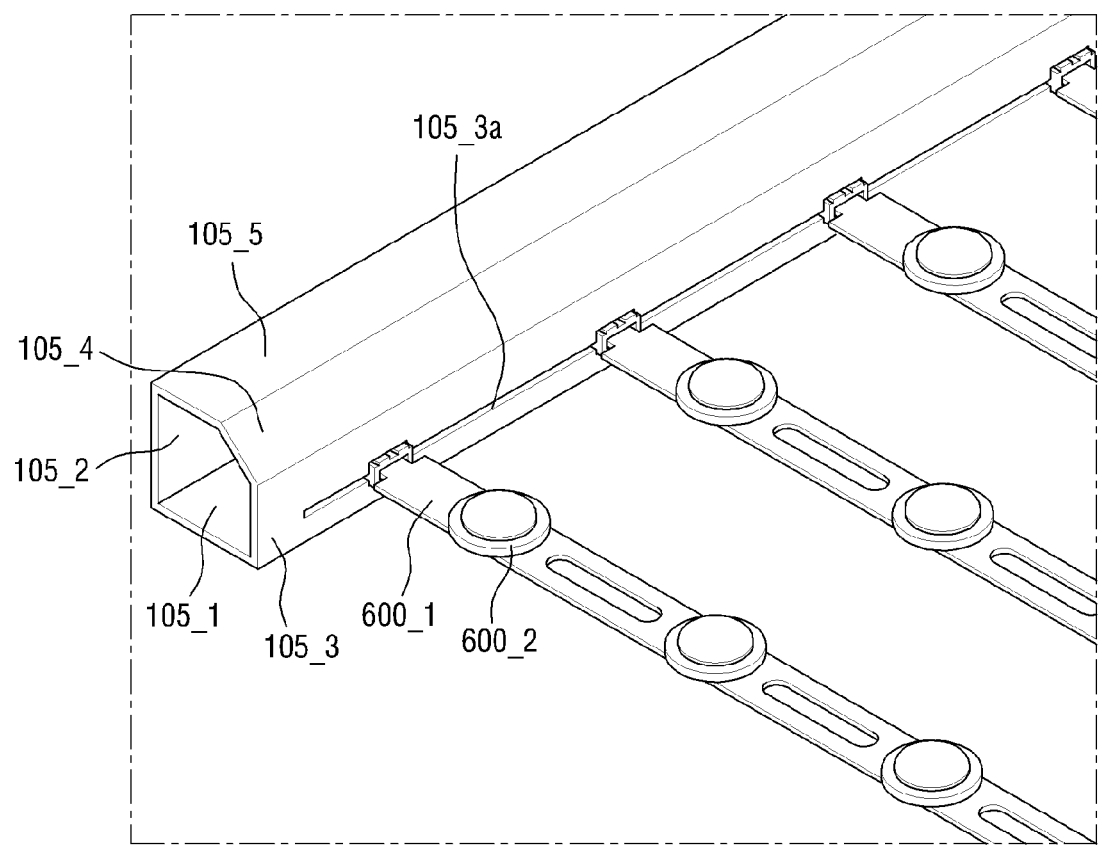
FIG. 17 is a perspective view of the backlight unit according to the exemplary embodiment of FIG. 15.

Referring to FIGS. 15 to 17, a second PCB 500_1 may be connected to a plurality of first PCBs 600_1 to totally control the plurality of first PCBs 600_1. That is, the second PCB 500_1 may transfer a control signal to the first PCBs 600_1, or may provide a power required to drive light emitting lamps 600_2. The second PCB 500_1 may be arranged in an inner space, that is, a cavity, of a support frame 105. In an exemplary embodiment, the second PCB 500_1 may be arranged on an upper surface of a bottom portion 105_1, and may be provided to extend along the length direction of the support frame 105. That is, the second PCB 500_1 may be arranged on any one selected from first to fourth sides of the support frame 105.

The connection socket 500_2 may electrically connect the first PCB 600_1 and the second PCB 500_1 to each other. In an exemplary embodiment, a plurality of connection sockets 500_2 may be aligned along the length direction in which the second PCB 500_1 extends. The respective connection sockets 500_2 may be fastened to the first PCB 600_1 to be electrically connected thereto. That is, the connection terminal 600_1a of the first PCB 600_1 may be inserted into and fastened to the connection socket 500_2, and thus the first PCB 600_1 and the second PCB 500_1 may be electrically connected to each other.

The connection socket 500_2 and the second PCB 500_1 may be inserted into the support frame 105 to be arranged in the cavity of the support frame 105. In this regard, an insertion groove 105_3a, into which the connection socket 500_2 and the second PCB 500_1 can be inserted, may be defined in a second side wall portion 105_3 of the support frame 105. The insertion groove 105_3a may be defined to extend along the length direction of the support frame 105, and in an exemplary embodiment, the height of the insertion groove 105_3a that corresponds to the connection socket 500_2 may be higher than the height of the insertion groove 105_3a that corresponds to the second PCB 500_1. A connection socket insertion groove 105_3b may be further defined in the second side wall portion 105_3. The connection socket 500_2 may be inserted through the connection socket insertion groove 105_3b. In an exemplary embodiment, a height of the connection socket insertion groove may be equal to or greater than that of the connection socket insertion groove 105_3b.

A part of the connection socket 500_2 may be arranged in the cavity, and the remaining part thereof may be arranged to project for a predetermined distance from the second side wall portion 105_3.

Figure 18:
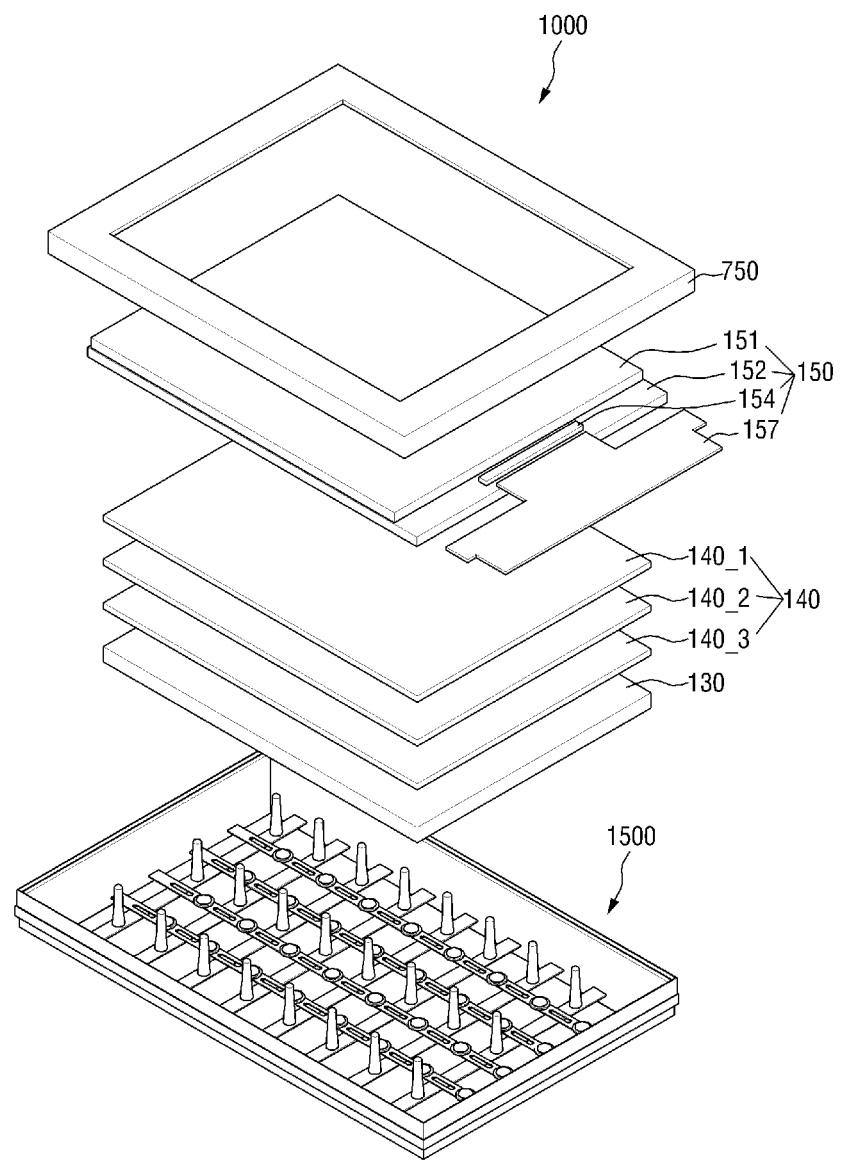
FIG. 18 is an exploded perspective view of a liquid crystal display according to an exemplary embodiment of the invention.

FIG. 18 is an exploded perspective view of a liquid crystal display ("LCD") according to an exemplary embodiment of the invention.

Referring to FIG. 18, a LCD 1000 according to an exemplary embodiment of the invention includes a backlight unit 1500, a diffusion plate arranged on an upper portion of the backlight unit, at least one optical sheet arranged on the diffusion plate, and a display panel arranged on the optical sheet. The backlight unit includes a light source portion providing light to the display panel, a reflection sheet arranged on a lower part of the light source portion, a mold frame accommodating the light source portion, and a support frame supporting the mold frame, where the support frame includes a bottom portion, first and second side wall portions provided to extend upward from both sides of the bottom portion and facing each other, a ceiling portion provided to extend in a horizontal direction from an upper end of the first side wall portion, and a slant portion slanted downward from an end part of the ceiling portion and having one end that comes in contact with the end part of the ceiling portion and the other end that comes in contact with an upper end of the second side wall portion.

The backlight unit 1500 may be substantially the same as the backlight unit 1500 according to some embodiments of the invention as described above. Accordingly, the detailed explanation thereof will be omitted.

A diffusion plate 130 may be arranged on the backlight unit 1500. The diffusion plate 130 may diffuse a part of light that is emitted from the backlight unit 1500, transfer the diffused light to the display panel 150 arranged on the upper portion of the diffusion plate 130, and reflect the other part of the light to the lower portion of the diffusion plate 130 again. In an exemplary embodiment, the diffusion plate 130 may include at least one material including Polymethyl methacrylate ("PMMA"), Polystyrene ("PS"), Polycarbonate ("PC"), Cyclo-olefin copolymers ("COC"), Polyethylene terephtalate ("PET"), Polybutyleneterephtalate ("PBT"), and a plastic material alloy. However, the material of the diffusion plate 130 is not limited thereto. Further, the diffusion plate 130 may be provided as a single layer, but is not limited thereto. The diffusion plate 130 may have a stacked structure in which a plurality of layers is stacked.

On the upper portion of the diffusion plate 130, at least one optical sheet 140 for modulating the optical characteristic of the light that penetrates the diffusion plate 130 may be arranged.

The optical sheet 140 may include at least one sheet. In an exemplary embodiment, the optical sheet 140 may include a diffusion sheet 140_1, a luminance improvement sheet 140_2, and a reflection polarizing sheet 140_3. The plurality of optical sheets 140 may be arranged on an upper portion of the diffusion plate 130 to increase the efficiency of the light emitted from the diffusion plate 130 and to provide uniform light luminance distribution.

The diffusion sheet 140_1 makes the light incident from the lower diffusion plate 130 be directed toward the front surface of the display panel 530, and diffuses the light so that the light has uniform distribution in a wide range to irradiate the display panel 530 with the diffused light. The diffusion sheet 140_1 may be a film that is composed of a transparent resin of which both surfaces are coated with a predetermined light diffusion member.

The luminance improvement sheet 140_2 may change the slantingly incident light of the light incident to the luminance improvement sheet 140_2 to be vertically emitted. This is because the light efficiency becomes higher when the light incident to the display panel 150 becomes perpendicular to the display panel 200.

The reflection polarizing sheet 140_3 transmits the light that is in parallel to its penetration axis, and reflects the light that is perpendicular to the penetration axis. In order to heighten the penetration efficiency, the penetration axis of the reflection polarizing sheet 140_3 may be in the same direction as the direction of the polarizing axis of the luminance improvement sheet 140_2, but is not limited thereto.

The display panel 150 may be arranged on the optical sheet 140. Further, a top chassis 750 may be arranged on the display panel 150.

The display panel 150 includes a display region and a non-display region. Further, the display panel 150 may include a first substrate 151, a second substrate 152 that faces the first substrate 151, a liquid crystal layer, and a driving portion 154 and a flexible circuit board 157 attached to the first substrate 151.

The display region of the display panel 150 may include a region where an image is displayed, and the non-display region of the display panel 150 may include a region where the image is not displayed. The display region may be positioned in a center portion of a region where the first substrate 151 and the second substrate 152 overlap each other, and the non-display region may be positioned in an edge portion of the region where the first substrate 151 and the second substrate 152 overlap each other. Further, the display region may be a region where the display panel 150 and the top chassis 750 do not overlap each other, and the non-display region may be a region where the display panel 150 and the top chassis 750 overlap each other. Further, the shape of the display region may be similar to the shape of the second substrate 152, but the internal area of the display region may be smaller than the internal area of the second substrate 152. Further, boundary lines between the display region and the non-display region may be in parallel to facing sides of the second substrate 152. Further, the shape of the boundary line between the display region and the non-display region may be a rectangle.

At least a part of the first substrate 151 may overlap the second substrate 152. The center portion of the region where the first substrate 151 and the second substrate 152 overlap each other may be the display region, and the edge portion of the region where the first substrate 151 and the second substrate 152 overlap each other may be the non-display region. The driving portion 154 and the flexible circuit board 157 may be attached to the region where the first substrate 151 and the second substrate 152 do not overlap each other.

The second substrate 152 may be arranged to face the first substrate 151. The liquid crystal layer may be interposed between the first substrate 151 and the second substrate 152. Between the first substrate 151 and the second substrate 152, a sealing member, such as a sealant, may be arranged along the edge portions of the first substrate 151 and the second substrate 152 to adhere and seal the first substrate 151 and the second substrate 152.

The first substrate 151 and the second substrate 152 may be in a cuboidal shape. For convenience in explanation, it is illustrated that the first substrate 151 and the second substrate 152 are in a cuboidal shape, but are not limited thereto. The first substrate 151 and the second substrate 152 may be manufactured in various shapes depending on the shape of the display panel 150.

The driving portion 154 may apply various signals, such as driving signals required to display an image on the display region. The flexible circuit board 157 may output various kinds of signals to the driving portion 154.

The top chassis 750 may cover the edge of the display panel 150 and may surround side surfaces of the display panel 150 and the backlight unit 1500.

Although preferred embodiments of the invention have been described for illustrative purposes, those skilled in the art will appreciate that various modifications, additions and substitutions are possible, without departing from the scope and spirit of the invention as disclosed in the accompanying claims.

What is claimed is:
1. A backlight unit comprising:
a light source portion configured to provide light to a display panel;
a reflection sheet arranged on a lower part of the light source portion;
a mold frame accommodating the light source portion; and
a support frame which supports the mold frame and comprises:
a bottom portion;
first and second side wall portions which extend upward from both end sides of the bottom portion and face each other;
a ceiling portion which extends in a horizontal direction from an upper end of the first side wall portion; and
a slant portion slanted downward from an end part of the ceiling portion and having one end which contacts the end part of the ceiling portion and the other end which contacts an upper end of the second side wall portion,
wherein
a slant region of the extending reflection sheet is supported by the slant portion of the support frame.
2. The backlight unit of claim 1, wherein a cavity, which is an inner space, is defined by the ceiling portion, the bottom portion, the first side wall portion, and the second side wall portion and extends along a length direction of the support frame.

3. The backlight unit of claim 1, wherein the mold frame comprises:
a side wall portion extending in a vertical direction; and
a seat portion projecting by a predetermined distance in the horizontal direction, from the side wall portion.

4. The backlight unit of claim 3, wherein
the side wall portion of the mold frame is fastened to the first side wall portion of the support frame, and
the seat portion of the mold frame is fastened to the ceiling portion of the support frame.

5. The backlight unit of claim 3, further comprising a support arranged at an upper end of the side wall portion of the mold frame.

6. The backlight unit of claim 3, wherein
the side wall portion of the mold frame and the first side wall portion of the support frame are fastened to each other by an engagement screw which penetrates the mold frame and the first side wall portion of the support frame, and
the seat portion of the mold frame and the ceiling portion of the support frame are fastened to each other by a fastening projection which is arranged on the seat portion of the mold frame and is inserted into a fastening hole which is defined in the ceiling portion of the support frame.

7. The backlight unit of claim 1, wherein
the reflection sheet is bent toward the support frame.

8. The backlight unit of claim 7, wherein a slope of the slant portion of the support frame is equal to a slope of the slant region of the reflection sheet.

9. The backlight unit of claim 7, wherein an end part of the extending reflection sheet is inserted and fixed to a fixing hole which is defined in a side wall portion of the mold frame.

10. The backlight unit of claim 1, wherein
the support frame further comprises four bar-shaped sub-support frames, and
neighboring sub-support frames are fastened to each other by an L-shaped fastening member.

11. The backlight unit of claim 1, wherein the support frame further comprises:
first and second sides which face each other and third and fourth sides which face each other, and
at least one support bar having one end which is fastened to the third side and the other end which is fastened to the fourth side.

12. The backlight unit of claim 11, further comprising at least one support column, which projects in a vertical direction from the support bar, arranged on the support bar.

13. The backlight unit of claim 1, wherein at least one opening is defined in the slant portion of the support frame.

14. The backlight unit of claim 2, wherein
the light source portion includes a first printed circuit board extending in the length direction and at least one light emitting lamp mounted on the first printed circuit board, and
the backlight unit further comprises a second printed circuit board arranged in the cavity and connection sockets electrically connected to the second printed circuit board, and
connection terminals of the first printed circuit board are inserted into the connection sockets, respectively, to electrically connect the second printed circuit board and the first printed circuit board to each other.

15. A liquid crystal display comprising:
a backlight unit;
a diffusion plate arranged on an upper part of the backlight unit;
at least one optical sheet arranged on an upper part of the diffusion plate; and
a display panel arranged on the at least one optical sheet,
wherein the backlight unit includes:
a light source portion configured to provide light to the display panel;
a reflection sheet arranged on a lower part of the light source portion;
a mold frame which accommodates the light source portion; and
a support frame which supports the mold frame, and comprises:
a bottom portion;
first and second side wall portions which extend upward from both end sides of the bottom portion and face each other;
a ceiling portion which extends in a horizontal direction from an upper end of the first side wall portion; and
a slant portion slanted downward from an end part of the ceiling portion and having one end which contacts the end part of the ceiling portion and the other end which contacts an upper end of the second side wall portion,
wherein
a slant region of the extending reflection sheet is supported by the slant portion of the support frame.

16. The liquid crystal display of claim 15, wherein a cavity, which is an inner space, is defined by the ceiling portion, the bottom portion, the first side wall portion, and the second side wall portion and extends along a length direction of the support frame.

17. The liquid crystal display of claim 15, wherein the mold frame comprises:
a side wall portion extending in a vertical direction; and
a seat portion projecting by a predetermined distance in the horizontal direction, from the side wall portion.

18. The liquid crystal display of claim 15, wherein
the reflection sheet is bent toward the support frame.

19. The liquid crystal display of claim 15, wherein the support frame further comprises:
first and second sides which face each other and third and fourth sides which face each other, and
at least one support bar having one end which is fastened to the third side and the other end which is fastened to the fourth side.

20. The liquid crystal display of claim 19, further comprising at least one support column, which is provided to project in a vertical direction from the support bar, arranged on the support bar.

* * * * *